US011943131B1

(12) United States Patent
Holl et al.

(10) Patent No.: US 11,943,131 B1
(45) Date of Patent: Mar. 26, 2024

(54) CONFIDENCE REINFORCEMENT OF AUTOMATED REMEDIATION DECISIONS THROUGH SERVICE HEALTH MEASUREMENTS

(71) Applicant: Cisco Technology, Inc., San Jose, CA (US)

(72) Inventors: Steven Michael Holl, Sarasota, FL (US); Jason A. Kuhne, Hopkinton, MA (US); Jason Michael Coleman, Hendersonville, NC (US); Gonzalo A. Salgueiro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/359,152

(22) Filed: Jul. 26, 2023

(51) Int. Cl.
*H04L 43/55* (2022.01)
*G06N 5/022* (2023.01)
*H04L 41/06* (2022.01)

(52) U.S. Cl.
CPC ............ *H04L 43/55* (2022.05); *G06N 5/022* (2013.01); *H04L 41/06* (2013.01)

(58) Field of Classification Search
None
See application file for complete search history.

(56) References Cited

U.S. PATENT DOCUMENTS

2010/0241891 A1 9/2010 Beasley
2011/0126111 A1 5/2011 Gill et al.
2015/0033348 A1 1/2015 Oliphant et al.
2015/0269048 A1 9/2015 Marr et al.
2016/0072835 A1 3/2016 Roytman et al.
2017/0102997 A1 4/2017 Purushothaman et al.
2017/0104840 A1* 4/2017 Spagnola .............. H04L 67/306
2017/0270490 A1* 9/2017 Penilla .................. G07C 5/006
2019/0065990 A1 2/2019 Sharma et al.
2019/0108081 A1 4/2019 Krishnan et al.

(Continued)

OTHER PUBLICATIONS

Cisco: "Cisco Connected TAC", Cisco, At-a-Glance, Mar. 2017, 1 Page.

(Continued)

*Primary Examiner* — Angela Nguyen
(74) *Attorney, Agent, or Firm* — Edell, Shapiro & Finnan, LLC

(57) ABSTRACT

A method comprises: by a controller to communicate with devices of a network, storing classifiers assigned to groups of the devices to identify device commonality for each group; associating, to the classifiers, historical probabilities of success with which an automated response executed by one or more of the devices remediates a device alarm event; when a device of the devices reports the device alarm event, identifying each classifier to which the device belongs, each historical probability for each classifier, and a rule with classifier thresholds for the automated response; determining to execute the automated response on the device by evaluating the rule using each historical probability and the classifier thresholds; after the automated response is executed, performing a service test supported across the devices, and monitoring test results from the service test; and after the service test, updating each historical probability using the test results.

20 Claims, 13 Drawing Sheets

(56) References Cited

U.S. PATENT DOCUMENTS

| | | | | |
|---|---|---|---|---|
| 2019/0146861 | A1 | 5/2019 | Joshi et al. | |
| 2019/0268366 | A1 | 8/2019 | Zeng et al. | |
| 2019/0310929 | A1 | 10/2019 | Wright et al. | |
| 2020/0218828 | A1 | 7/2020 | Barday et al. | |
| 2021/0081189 | A1 | 3/2021 | Nucci et al. | |
| 2022/0366340 | A1 | 11/2022 | Chen et al. | |
| 2023/0099153 | A1 | 3/2023 | Allen et al. | |
| 2023/0318906 | A1* | 10/2023 | Xie | H04L 41/0654 709/220 |

OTHER PUBLICATIONS

Dash G., et al., "Quasi-Optimal Software Recommendation Analytics System (Opera) for Network Devices", Technical Disclosure Commons, Jun. 21, 2018, 19 Pages, Retrieved from URL: https://www.tdcommons.org/dpubs_series/1274.

Gaggar P., et al., "Reinforcement Learning Based Recommendation System for Software Upgrades", Technical Disclosure Commons, Nov. 21, 2018, 8 Pages, Retrieved from URL: https://www.tdcommons.org/dpubs_series/1696.

Horn D., "Building Confidence in Test Automation", Dataversity, May 3, 2019, 4 Pages.

Rajivan P., et al., "Update Now or Later? Effects of Experience, Cost, and Risk Preference on Update Decisions", Journal of Cybersecurity, Research paper, vol. 6, No. 1, Jan. 28, 2020, 12 Pages.

Thurai A., "GigaOm Radar for Cloud Observability V1.0", GigaOm, Feb. 26, 2021, 37 Pages.

* cited by examiner

700

50 %

CONFIDENCE REINFORCEMENT OF AUTOMATED REMEDIATION DECISIONS THROUGH SERVICE HEALTH MEASUREMENTS

TECHNICAL FIELD

The present disclosure relates generally to automated remediation of device faults in a network.

BACKGROUND

As information technology (IT) infrastructure becomes more complex, and decision making becomes more intelligent, automated incident management positions itself as the future of network infrastructure management. There are many shortcomings, however, to be overcome for effective autonomous remediation of IT infrastructure faults. Failure to account for these challenges introduces greater problems, such as chaos from chain-effects of automated remediation actions, which may arise from not considering feedback on how automated tasks or actions are affecting the critical services running over the top of the IT infrastructure.

Autonomous remediation in the form of automated actions triggered by events reported by devices of the IT infrastructure can be readily programmed, but can have an unknown and an undesired impact on the services running over the IT infrastructure. Conventional approaches to applying the automated actions do not possess intelligence to learn from mistakes made by the automated actions, do not prevent repeat failures, and do not drive improvement in either automated action decision making or the stability of the IT infrastructure without human input. Moreover, the conventional approaches suffer from a lack of intelligent feedback on whether the automated actions fix problems or do not fix problems.

DETAILED DESCRIPTION

Overview

Figure 1A:
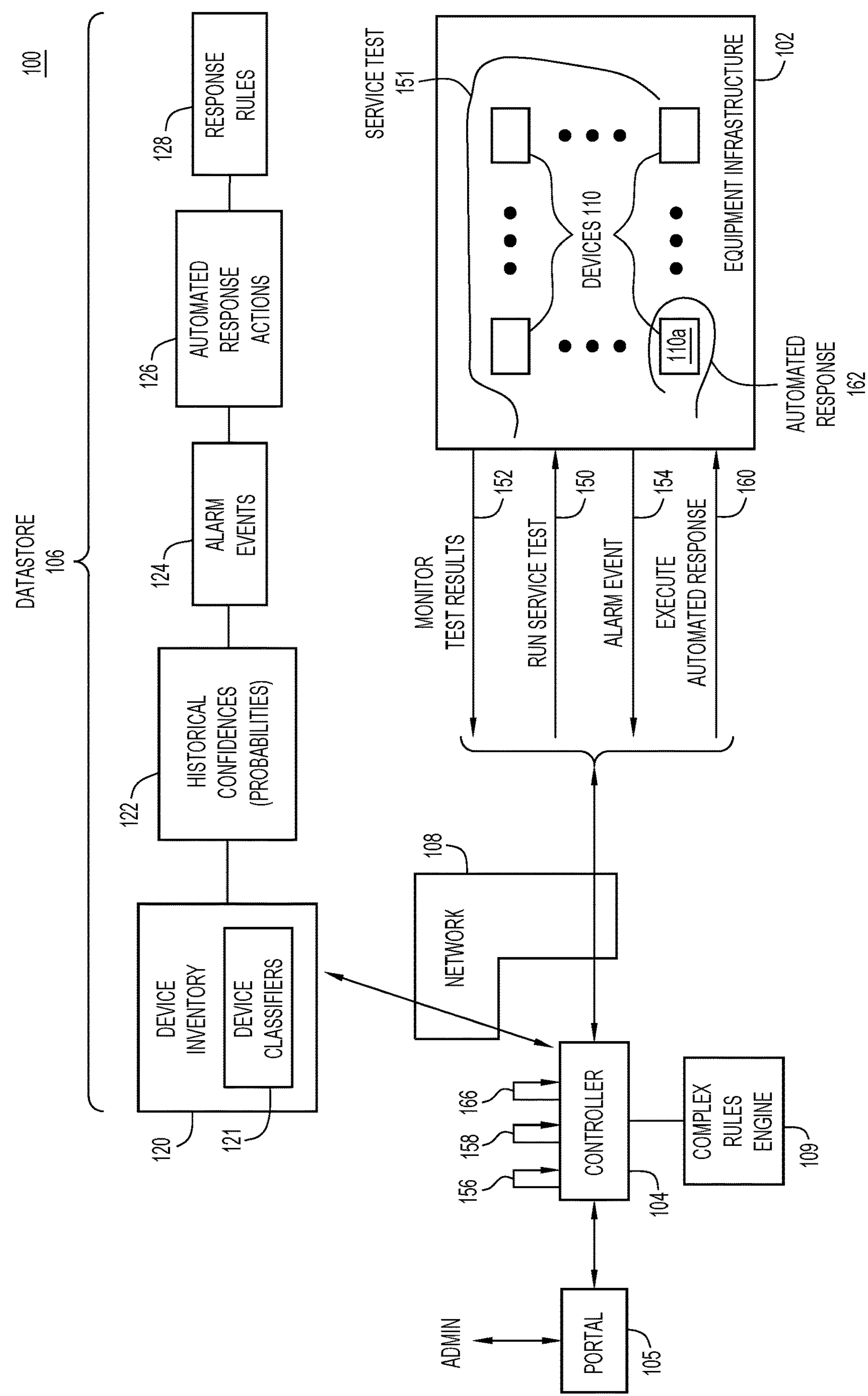
FIG. 1A is a block diagram of a system in which confidence reinforcement of automated remediation decision making through full-stack observations and service health measurements may be implemented, according to an example embodiment.

In an embodiment, a method comprises: by a controller configured to communicate with devices of a network, storing classifiers assigned to groups of the devices to identify device commonality that is distinct for each group; associating, to the classifiers, historical probabilities of success with which an automated response executed by one or more of the devices remediates a device alarm event; when a device of the devices reports the device alarm event, identifying each classifier to which the device belongs, each historical probability for each classifier, and a rule with classifier thresholds for evaluating whether to execute the automated response on the device; determining to execute the automated response on the device by evaluating the rule using each historical probability and the classifier thresholds; after the automated response is executed on the device, performing a service test to test a service supported across the devices, and monitoring test results from the service test; and after performing the service test, updating each historical probability using the test results.

Example Embodiments

Embodiments presented herein provide a closed-loop system configured to measure the success of auto-remediation and self-healing tasks primarily referred to as "automated responses" after they have been executed on an equipment infrastructure, such as a network, to remediate alarm events. The embodiments condition deployment of the automated responses to devices that report alarm events based on evaluations of response rules against computed complex historical confidence scores (also referred to simply as "confidences") that represent "historical probabilities of success" that the automated responses remediate the alarm events, as measured by improved service performance. The embodiments compute the historical confidence scores within multiple localized/specific classifiers (also referred to as "classifications") of groups of devices or "scopes" (e.g., devices within the same city, devices that are the same model, devices that match a specific business, and so on) and a global scope that spans the specific classifiers (e.g., across all cities, across all models, and across all businesses).

The embodiments reinforce the historical confidence scores/historical probabilities of success of the automated responses, based on historical success rates of the automated responses compared within the specific classifiers (e.g., success rates of the automated responses performed on devices specifically in Tokyo, or for Catalyst 9004 devices by Cisco, but not on ISR 4400 routers by Cisco). The embodiments also provide automatic closed-loop measurements of success using "synthetic" service tests, and using a human reinforcement layer of observation and influence.

The embodiments employ a complex rules engine that allows for granular control over the response rules to permit the automated responses to run (i.e., execute) or not run with specificity for the specific classifiers associated with a given device. This permits administrators to control an amount of risk that can be tolerated with specificity for the given device, its location, or other parameters, as not all devices in all environments tolerate the same level of risk. The embodiments further permit role-based human reinforcement of the historical confidence scores.

FIG. 1A is a block diagram of an example system 100 in which confidence reinforcement of automated remediation decision making through full-stack observations and service health measurements may be implemented. System 100 includes an equipment infrastructure 102 (which may be configured as a network) that supports various network-based services, a controller 104 accessible by an administrator through a portal 105, a datastore 106, and a network 108 connected to, and over which, the equipment infrastructure, the controller, and the datastore communicate with each other. Controller 104 implements a complex rules engine 109 to define and evaluate logic for response rules, as described below. Controller 104 is depicted as a single entity in FIG. 1A by way of example only. It is understood that controller 104 may include multiple network management and control entities/functions configured to perform operations presented herein. Through portal 105, the administrator may provision and control aspects of system 100. Although shown separately, equipment infrastructure 102 may form part of network 108. Network 108 may include one or more wide area networks (WANs), such as the Internet, and one or more local area networks (LANs), that convey traffic (e.g., data packets) between equipment infrastructure 102, controller 104, and datastore 106 using any known or hereafter developed communication protocols, such as the transmission control protocol (TCP)/Internet Protocol (IP), and the like.

Equipment infrastructure 102 includes a collection of interconnected equipment or devices 110, such as equipment provided in a data center, network, and so on. The equipment may include devices 110 (such as hardware devices, applications hosted on the hardware devices, and virtual devices) to provide compute, storage, and network resources in the data center, and/or the network, for example. Equipment infrastructure 102 may include servers, network devices, such as routers and switches, and the like, for example. The devices 110 may be co-located at a geographic location ("geolocation") or may be distributed across multiple spaced-apart geolocations. Devices 110 can communicate with controller 104 over network 108.

Controller 104 has access to datastore 106, which may be stored locally to the controller or offsite. Datastore 106 includes a device inventory 120 of devices 110, classifiers 121 (also referred to as "device classifiers" and "classifications") that may form part of the device inventory, historical confidence scores 122 associated with (i.e., mapped to) corresponding ones of the classifiers, a list of alarm events 124, a list of (and executable components of) automated responses 126 mapped to corresponding ones of the alarm events, and response rules 128 for/mapped to corresponding ones of the automated responses. Device inventory 120 includes an inventory of devices 110 as discovered by controller 104. Controller 104 may discover devices 110 using any known or hereafter developed device discovery technique. Device inventory 120 includes identifiers of, and other information related to, the devices, such as IP addresses, device names, and so on. Data objects described herein may be mapped to each other using any known or hereafter developed mapping constructs such as address pointers, shared data object names, common memory spaces, database mapping constructs, and the like.

Classifiers 121 are assigned to devices 110 as listed in device inventory 120. Example classifiers are described below in connection with FIGS. 2-4. The administrator may assign classifiers 121 to devices 110 during provisioning of system 100 and thereafter. In other arrangements, classifiers 121 may be configured on devices 110 and discoverable by controller 104. Classifiers 121 include descriptive labels or tags that identify commonality among the devices to which the classifiers are assigned. That is, the classifiers are assigned to groups (i.e., multiple ones) of the devices to identify device commonality that is distinct for each group. Classifiers may include/define logical attributes of devices 110. For example, classifiers 121 include, but are not limited to, device location (e.g., Tokyo, Bangalore, etc.), device type (e.g., router, switch, etc.), device model (e.g., XP400, SRS50), business identity (e.g., enterprise A, enterprise B), and so on. As such, a classifier (e.g., location) may define a set of classifier values or sub-classifiers (e.g., Tokyo, Bangalore, and so on). Classifiers, classifier values, and sub-classifiers are all generally referred to as "classifiers."

Historical confidence scores 122 (also referred to simply as "confidences") are mapped to corresponding ones of classifiers 121 (e.g., one historical confidence score per classifier). Historical confidence scores 122 represent computed historical probabilities that corresponding automated responses (defined below), when executed on devices 110, will remediate (e.g., clear, obviate, or otherwise overcome) corresponding alarm events (also defined below) successfully to improve the performance of the services supported by the devices. In other words, historical confidence scores 122 represent historical probabilities of success of the automated responses in remediating the alarm events to improve the services. Historical confidence scores 122 are provisioned on system 100 with initial values (e.g., 50%) set by the administrator through portal 105. Once provisioned, system 100 recomputes or updates historical confidence scores 122 over time to indicate the historical success of the automated responses as remediators, as described below.

In various examples, alarm events 124 represent specifically identifiable degraded conditions of devices 110 that can negatively impact or degrade a service that runs on the devices. Such degraded conditions may include, low or degraded device resources, such as device component failures, low memory, low central processing unit (CPU) availability, and saturated or overloaded interfaces/ports, for example. Each device can detect alarm events locally and report the same to controller 104. Automated responses 126 are mapped to corresponding ones of alarm events 124. An automated response is an automated remediation task configured to be executed by a device to remediate a corresponding alarm event reported by the device to controller 104 (or other remediating entity). An automated response for a device includes, but is not limited to, executable code (e.g., a code snippet) compatible with the device (i.e., that the device executes to perform a task), a configuration command for the device, and so on. Controller 104 can command the device to perform/execute the automated response. That is, controller 104 deploys the automated response to the device, which then executes the automated response. Automated responses may also be referred to as any of automated tasks, automated actions, automated remediations, automated response actions, action responses, and response actions.

Response rules 128 are mapped to corresponding ones of automated responses 126. Example response rules are described below in connection with FIGS. 5-7. Controller 104 determines whether to deploy automated responses 126 to devices 110 to remediate alarm events 124 reported by the devices based on historical confidence scores 122, response rules 128, and confidence thresholds associated with the response rules. More specifically, controller 104 compares the historical confidence scores 122 to the confidence thresholds in accordance with the response rules, to produce decisions as to whether to deploy the automated responses. The administrator may provision the confidence thresholds on complex rules engine 109 through portal 105. Complex rules engine 109 assists controller 104 with the aforementioned evaluation of response rules 128, as described below.

Controller 104 interacts with equipment infrastructure 102, datastore 106, complex rules engine 109, and portal 105 to implement the confidence reinforcement of automated remediation decisions through full-stack observations and service health measurements. High-level operations for implementing the foregoing are now described. At 150, controller 104 repeatedly initiates a service test 151 (or multiple different types of service tests) that runs on devices 110, to produce test results indicative of service health. An example service test is described below in connection with FIG. 8. At 152, controller 104 receives and monitors the test results. Operations 150 and 152 collectively represent "service health measurement" performed in system 100. Asynchronously to 150 and 152, at 154, a device (e.g., device 110*a*) among devices 110 detects an alarm event and reports the same to controller 104. Upon receiving the alarm event, at 156, controller 104 retrieves from datastore 106 (*i*) historical confidence scores for classifiers to which the device (e.g., device 110*a*) belongs based on an identity of the device, (ii) an automated response to remediate the alarm event, and (iii) response rules and their confidence thresholds as mapped to the automated response.

At 158, controller 104 determines whether to command the device to execute the automated response (i.e., to deploy the automated response to the device for execution by the device) based on the response rules, the confidence thresholds, and the historical confidence scores. For example, controller 104 compares the historical confidence scores against the confidence thresholds in accordance with logic defined by the response rules, to produce an outcome indicative of whether to deploy/execute the automated response. In some examples, "role-based human reinforcement" may also be leveraged to influence the outcome. When the outcome indicates to permit/deploy/execute the automated response, at 160, controller 104 commands the device to execute the automated response, which the device executes at 162. On the other hand, when the outcome indicates not to execute the automated response, controller 104 does not command the device to execute the automated response. In summary, operations 150-162 detect/observe the alarm event, match the alarm event to the automated response, and potentially automatically apply the automated response to remediate the alarm event based on the response rules. The foregoing is referred to as an "automation workflow."

Assume that the outcome indicates to deploy the automated response, which the device executes. After the device executes the automated response (i.e., after the automation workflow has executed the automated response), controller 104 continues to run service test 151 and monitor its test results, specifically to determine whether execution of the automated response by the device resulted in improved service health. At 166, controller 104 performs a "complex confidence calculation" to update/recompute the historical confidence scores corresponding to the automated response based/depending on the test results, i.e., to reflect the test results.

When the test results indicate that the service health improved (e.g., the test results indicate a pass or a quantitative service improvement), controller 104 increases the historical confidence scores by a predetermined amount, e.g., 5%, 10%, or some other amount. In other words, the historical probability that the automated response is successful increases for the next round. Therefore, the next time that the alarm event is reported, system 100 will be more likely to deploy the automated response to remediate the alarm event.

On the other hand, when the test results indicate that the service health degraded (e.g., a failure or a quantitative degradation), controller 104 decreases the historical confidence scores by a predetermined amount, e.g., 5%, 10%, or some other amount. In other words, the historical probability that the automated response is successful decreases for the next round. Therefore, the next time that the alarm event is reported, system 100 will be less likely to deploy the automated response to remediate the alarm event.

Several main functions introduced above are now describe in further detail, including service health measurement, complex confidence calculation, complex rules engine 109, and role-based human reinforcement. First, the service health measurement leverages known or hereafter developed network full-stack serviceability tools (e.g., ThousandEyes or AppDynamics applications by Cisco) to baseline service health and measure the success of an automated response. The service health measurement represents an "always-on" measurement system that employs service tests repeatedly to produce test results indicative of service health, correlates the service tests/test results to devices that have performed automated responses to remediate alarm events, and historically grades the confidence with which the automated responses remediated the alarm events based on prior impacts to service health caused by the automated responses.

The service health measurement allows for unsupervised and closed-loop learning of automated remediation (i.e., automatically deploying the automated responses to the devices to remediate the alarm events), as well as measuring the true impact of the automated responses on supported services. Failed results produced by an automated response (i.e., a failure to remediate an alarm event) executed by a device may not be observable in key performance indicators (KPIs) generated locally by the device, and may best be observable at a level of a service that runs on the device. Thus, monitoring test results of service tests may be an effective way to catch the failed results.

Second, the complex confidence calculation calculates historical confidence scores for automated responses based on correlated service tests. The complex confidence calculation computes historical confidence scores (i.e., confidences of success) of an automated response at various scopes (i.e., across different classifiers and levels of the classifiers) to convey affinities for the historical confidence scores for the automated response in a specific environment. For example, different scopes/classifier levels may reveal the confidence of success of rebooting a device to resolve an alarm event=high CPU on all devices with a device model classifier=Aggregated Service Router (ASR) 1004, and the confidence of success of shutting-down a primary interface on a device type classifier=router in a device location classifier=Tokyo (compared to historically shutting-down interfaces on devices with the device location classifier=Tokyo). Historical confidence is self-learning and can be unsupervised in a closed-loop system. Automated promotion/demotion of automated response can be performed, based on calculating dynamic historical confidence scores. Thus, the embodiments provide the ability to adjust a learning rate for the historical confidence scores, to fine tune velocity of trusting an automated response if it is new or produces changing results.

Third, complex rules engine 109 allows the administrator to define confidence thresholds for confidence scores corresponding to classifiers at both a localized scope (e.g., classifier=device location, classifier=device model, and classifier=device geolocation or region) and/or at a global level, which represents a combined or aggregate scope. This provides flexibility and protection of automated response/automation influence. For example, a confidence threshold may permit first-time introduction of an automated response/automation at a geolocation, provided that a historical confidence score for the automated response at other geolocations exceeds a certain threshold (i.e., a certain success rate). Conversely, an administrator may not want to run an immature automated response in a specific local environment (e.g., rebooting a core switch on a Tokyo trading floor), and may therefore set the confidence threshold for the automated response to run when the confidence of running the automated response in Tokyo is 95% or above.

Fourth, role-based human reinforcement allows human/administrator control over the processes presented herein through portal 105. In a situation in which a historical confidence score for an automated response is not sufficiently high to permit execution of the automated response, the administrator may choose to supervise deployment (i.e., execution) of the automated response in order to increase the historical confidence score, or to lower a historical confidence score of an automated response that a service test failed to auto-detect. To this end, the administrator may install user profiles to control which users can run which automated responses. The user profiles carry attributes of historical confidence sores for automated responses the users have approved to run manually. This approval system can leverage the user profiles to allow users with a specified track record to run automated responses (e.g., to permit those users with an approval rating >90%; where 90% would be measured by a user approving 10 manual automated responses to run with 1 service impact detected). Human reinforcement can also be used to mark an automated response that has run in the past as being service impacting, for situations where the synthetic service level test did not detect the degradation of the service.

Figure 1B:
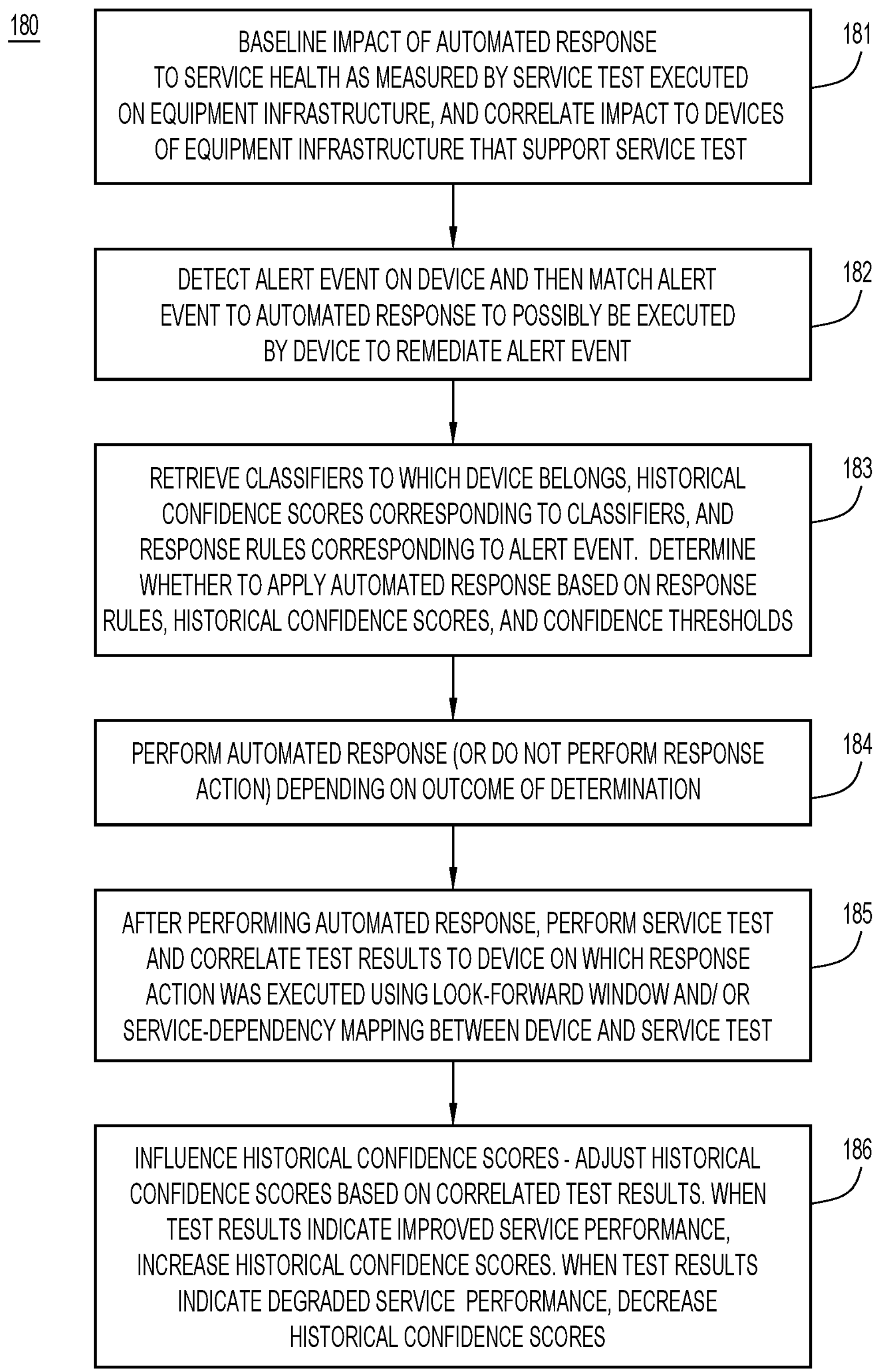
FIG. 1B shows a sequence of operations performed by the system to implement the confidence reinforcement of automated remediation decision, according to an example embodiment.

FIG. 1B shows an example sequence of operations 180 performed by system 100 to implement confidence reinforcement of automated remediation decision making through full-stack observations and service health measurements. Sequence of operations 180 expand on the operations described above. FIG. 1B is described with continued reference to FIG. 1A.

At 181, system 100 employs the service health measurement as described above to provide a baseline measurement of an impact of an automated response to a service test performed across equipment infrastructure 102, and also to correlate the impact to devices that support the service test. The system 100 repeatedly runs the service test using the full-stack observability tools mentioned above to measure the success of the automated response targeted to a device to remediate an alarm event. To this end, the service test produces a test result (i.e., a service health measurement) that is used to historically grade a confidence of success (i.e., a historical confidence score) that the automated response improves service health. The service test may include a TCP/IP-based service test (which may employ protocols such as the hypertext transfer protocol secure (HTTPS) protocol, and TCP/user datagram protocol (UDP)/Internet control message protocol (ICMP)) directed toward defined business targets. The service test is performed at a business service interface layer, which measures a true reachability and performance of a business service running over the top of the devices of equipment infrastructure 102.

In addition, the system 100 dynamically builds/maintains a dependency mapping between the service test, test results produced by the service test (i.e., a service health measurement), and the devices that support the service test. The dependency mapping attributes a service health impact uncovered by the service test to one or more devices that contribute to the service health impact. Such attribution is leveraged by other functions, described below. Various known applications, such as ThousandEyes and ApplicationDynamics by Cisco, offer the ability, through tomography, to automatically map-out network hops and/or service dependency paths. This constructs a service-to-device dependency map of underlying components/devices/IP addresses upon which a business service overlay depends.

The service-to-device dependency map reinforces the historical confidence scores that measure the historical success of automated responses targeted to devices to remediate alarm events generated at the devices. The service-to-device dependency map attributes a target device (e.g., a router with IP address 192.0.2.100) as a dependency for a service tested by the service test. The attribution indicates to the system that, with respect to executing an automated response on the target device, the system should monitor the test results of running the service test both before and after the target device executes the automated response, to gain an understanding of what impact the automated response had on the service health.

At 182, the system 100 detects an alarm event and then matches the alarm event to an automated response to remediate the alarm event. The alarm event and the automated response are listed in and mapped to each other through alarm events 124 and automated responses 126. A device detects the alarm event through a device health monitoring platform. The alarm event may take the form of any of a simple network management protocol (SNMP) trap, a syslog message log signature match, and a key performance indicator (KPI), such as a CPU exceeding a threshold, and the like. The device reports the alarm event to the system (e.g., to controller 104), which learns an identity of the device from the report. The system (e.g., controller 104) accesses the automated response mapped to the alert in datastore 106.

In an example, the system 100 detects the alarm event, reports the alarm event, and then matches the alarm event to the automated response using a network management system (NMS), which performs event management and fault detection in a manner that is distributed across controller 104 and equipment infrastructure 102. That is, the NMS is incorporated into controller 104 and equipment infrastructure 102. In another embodiment described below in connection with FIG. 1C, the NMS is separate from controller 104. In an example, the NMS may detect, as the alarm event, that an interface on a router with IP address 192.0.2.102 has a 7% packet loss. The alarm event is matched to the automated response, which is configured to troubleshoot the router and perform an automated action, such as to command a reset of the interface. Detecting the alarm event, reporting the alarm event, and matching the same to the automated response serves as a stimulus to subsequent operations that form a closed loop, with feedback provided from the service test.

From 182, the system learns the identity of the device that reported the alarm event, the alarm event, and the automated response for the alarm event. Armed with the aforementioned information, at 183, the system identifies response rules mapped to the alarm event and performs a lookup of historical confidence scores against the response rules, as is now described. The system (i) retrieves the classifiers to which the device belongs from device inventory 120/classifiers 121 using the identity of the device as an index, (ii) retrieves the historical confidence scores corresponding to the classifiers from historical confidence scores 122, and (iii) retrieves the response rules corresponding to the alarm event from response rules 128.

The response rules represent a complex granular rule-set (e.g., complex Boolean logic) to evaluate the automated response based on confidence thresholds (as defined in complex rules engine 109) for the historical confidence scores of the classifiers to which the device belongs. Together, the response rules and the confidence thresholds govern whether the automated response should be deployed to the device in order to remediate the alarm event. More specifically, using complex rules engine 109, the system determines whether to deploy the automated response based on a comparison of the historical confidence scores against their corresponding confidence thresholds in accordance with the response rules. Generally, when the historical confidence scores are equal to or exceed their corresponding confidence thresholds, the system is approved to deploy the automated response, whereas when the historical confidence scores are less than their corresponding confidence thresholds, the system is not approved to deploy the automated response.

Complex rules engine 109 advantageously allows for multiple criteria to be defined, adding precision to deciding when auto-remediation is permissible for a given environment, based on unique parameters and the response rules. Complex rules engine 109 allows for the logical combination of multiple rules to produce complex response rules as desired by the administrator. Such complex response rules create flexibility to ensure the administrator can control a desired level of match to any given situation for any possible response action. Allowing the setting of response rules to permit an automated response based solely on historical confidence scores within specific classifiers (such as classifier=device type, device geolocation, time-of-day, and so on), rather than being tied to a specific device, provides a granularity in control that extends beyond conventional automation system control.

System 100 may generate any of the following possible responses or outcomes based on the evaluation of the response rules using the confidence thresholds and the historical confidence scores:

a. Approved.
b. Approve conditionally.
c. Manual approval.
d. Denied.

At 184, system 100 takes an action based on the above outcomes. In other words, based on the confidence thresholds and the response rules as matched at 183, system 100 potentially takes the automated response in accordance with the following states:

a. If Approved: Risk tolerance for the device is accepted. Proceed with the automated response, i.e., deploy the automated response to the device. Success of the automated response will be measured subsequently at 185, described below.
b. If Approve conditionally: Execute/deploy an additional response action for additional checks, and expect a "pass" result before applying the automated response. This is a transient state, which moves to Approved upon a successful result from the additional response action when deployed/executed, or Denied if the expected result is not observed. This state allows chaining or recursion of response actions.
c. If Manual approval: Present the task to a defined approval group for manual supervised approval by the administrator before executing the automated response. This state is for response actions with lower confidence scores than can be trusted to run in a closed-loop or unsupervised approach. If the automated response is approved by the administrator, and the automated response is found to have a service impact, an approver's rating may be negatively impacted in the approver's user profile.
d. If Denied: Do not proceed with the automated response. No further action is taken.

At 185, after the automated response has been performed by the device, the system performs the service test to produce test results, and correlates the test results to the device. The system may use any of multiple methods to correlate the service test to the device targeted by the automated response.

A first method includes a time-based correlation that employs a look-forward window of a given time duration. The test results of all service tests performed during the look-forward window are used to score the success of the (previously executed) automated response. For example, if the automated response ran at time=01:00, and the look-forward window for that response action is a duration=00:30, any service tests that transition to an alarm state within a time range=01:00-01:30 are associated to the automated response (and, e.g., negatively or positively) impact the historical confidence score. The administrator may review the correlations at a later time and remove associations that the administrator deems as coincidental and not causal with respect to the action response.

A second method includes service-dependency correlation. A service test may be deemed relevant to scoring the success of the previous automated response when an IP address of the device targeted by the automated response is in a dependency table for a test path that was exercised or used by the service test. This condition may also be combined with the look-forward window. The following sequence is an example of using the service-dependency correlation:

a. Query: What service tests have seen device with IP address=192.0.1.150 in the network path in the last 24 hours?
b. Answer: IP address=192.0.1.150 has been observed in the following service tests:
   i. Api.example.com.
   ii. Mail.example.com.

c. Action: Correlate the service tests for api.example.com and mail.example.com to any changes/action responses applied to the device with IP address=192.0.1.150, since there is a known device dependency for those service tests.

At 186, the system adjusts the confidence scores based on the test result of the service test (as correlated at 185). The following outcomes are possible based on the test result:

a. No service impact found (e.g., no alerts from the service tests): Increase the historical confidence score of the automated response by 10% (or other amount) from a current value of the historical confidence score.

b. Service is hard down (e.g., no response, timeout, or result does not match expected result): Reduce historical confidence score by 50% (or other amount) from the current value.

c. Service is degraded (e.g., proper response is observed, but response time is outside of specification): Reduce historical confidence score by 25% (or other amount) of the current value.

Historical confidence scores may be instantiated/initialized at 50% for new response actions. The historical confidence score influence listed above is computed for and applied to all localized classifiers of the device (i.e., to which the device belongs), e.g., device type, device geolocation, device mode, and so on. In turn, the changes to the localized historical confidence scores influence changes to the global historical confidence score. In other words, when an automated response runs on a device, system 100 updates/computes the historical confidence score for the automated response for each classifier to which the device belongs, and also updates/computes the global historical confidence score for the automated response.

The administrator may change a "learning rate" for a historical confidence score based on a change to the 10%, 25%, and 50% adjustment listed above by way of example.

Figure 1C:
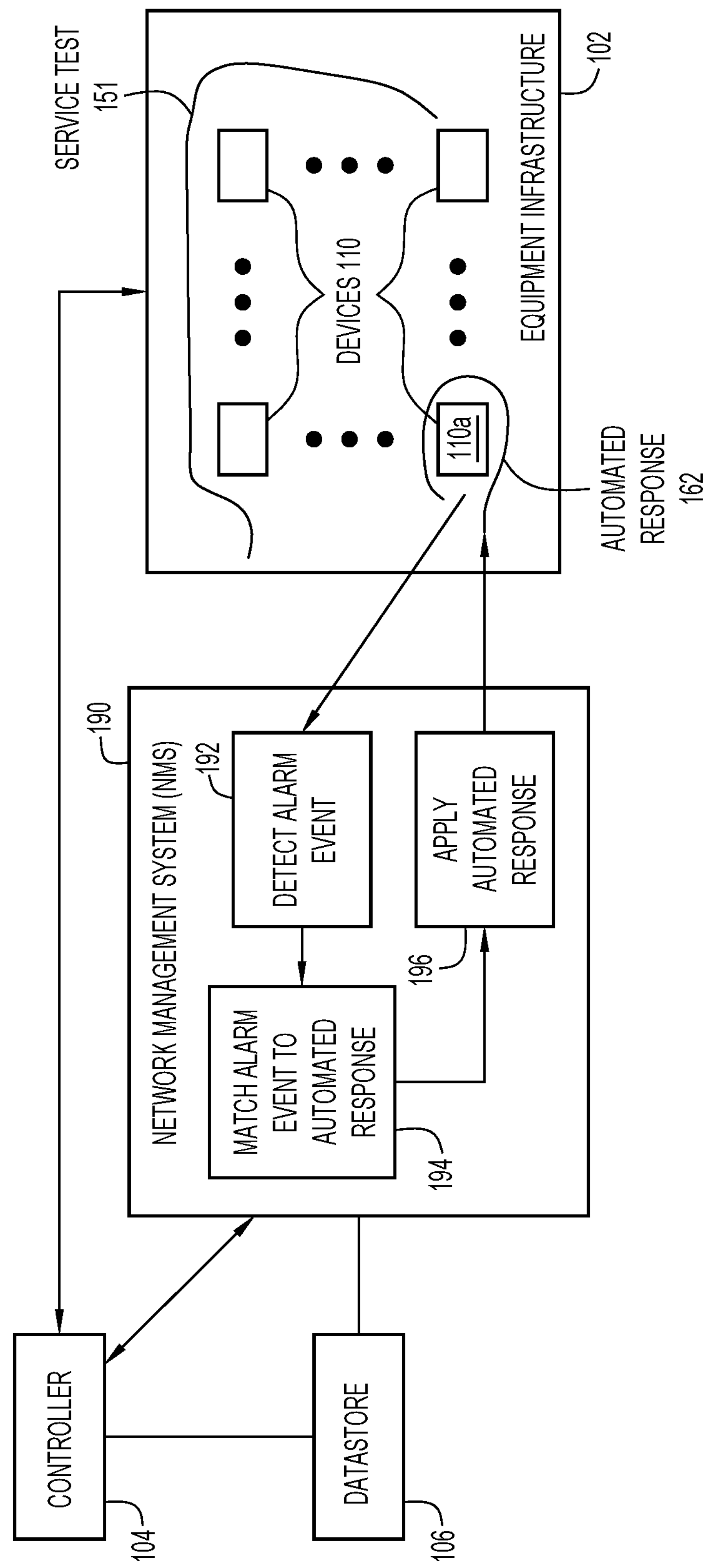
FIG. 1C is a block diagram of the system according to an alternative example embodiment.

FIG. 1C is a block diagram of system 100 configured according to an alternative embodiment. The alternative embodiment shown in FIG. 1C includes an NMS 190 (also referred to as a "network event manager") separate from controller 104 and configured to communicate/interact with the controller, datastore 106, and equipment infrastructure 102 to implement the embodiments presented herein. Network 108 is omitted from FIG. 1C for clarity. NMS 190 may store content from datastore 106 locally. NMS 190 performs NMS functions as described above in connection with FIGS. 1A and 1B (e.g., see FIG. 1B, 182). Specifically, NMS 190 includes a detect function 192 to detect alarm events on devices 110 (e.g., on device 110*a*), a match function 194 to match the alarm events to automated responses, and an apply function 196 to apply automated responses to the devices (e.g., to device 110*a*). NMS 190 also registers the alarm events with controller 104 to enable the controller to perform functions not provided by the NMS. An advantage of the alternative embodiment is to reduce a computation burden on controller 104.

Figure 2:
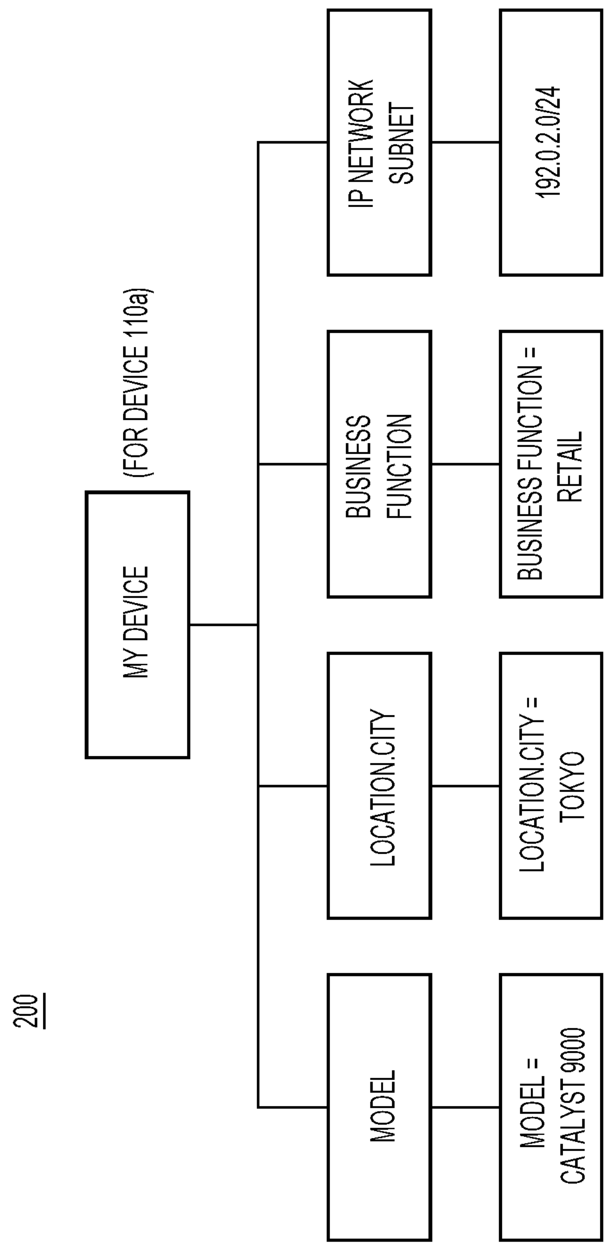
FIG. 2 shows a hierarchy of classifiers that are assigned to a device of an equipment infrastructure of the system, according to an example embodiment.

Example classifiers are now described in connection with FIGS. 2-4. FIG. 2 shows an example hierarchy of classifiers 200 of classifiers 121 that are assigned to device 110*a* of devices 110. Device 110*a* is identified as "My Device" in device inventory 120. Classifiers 200 include Model, Location.City, Business Function, and IP network subnet with respective classifier values=Catalyst 9000, Tokyo, Retail, and 19.0.2.0/24, respectively.

Figure 3:
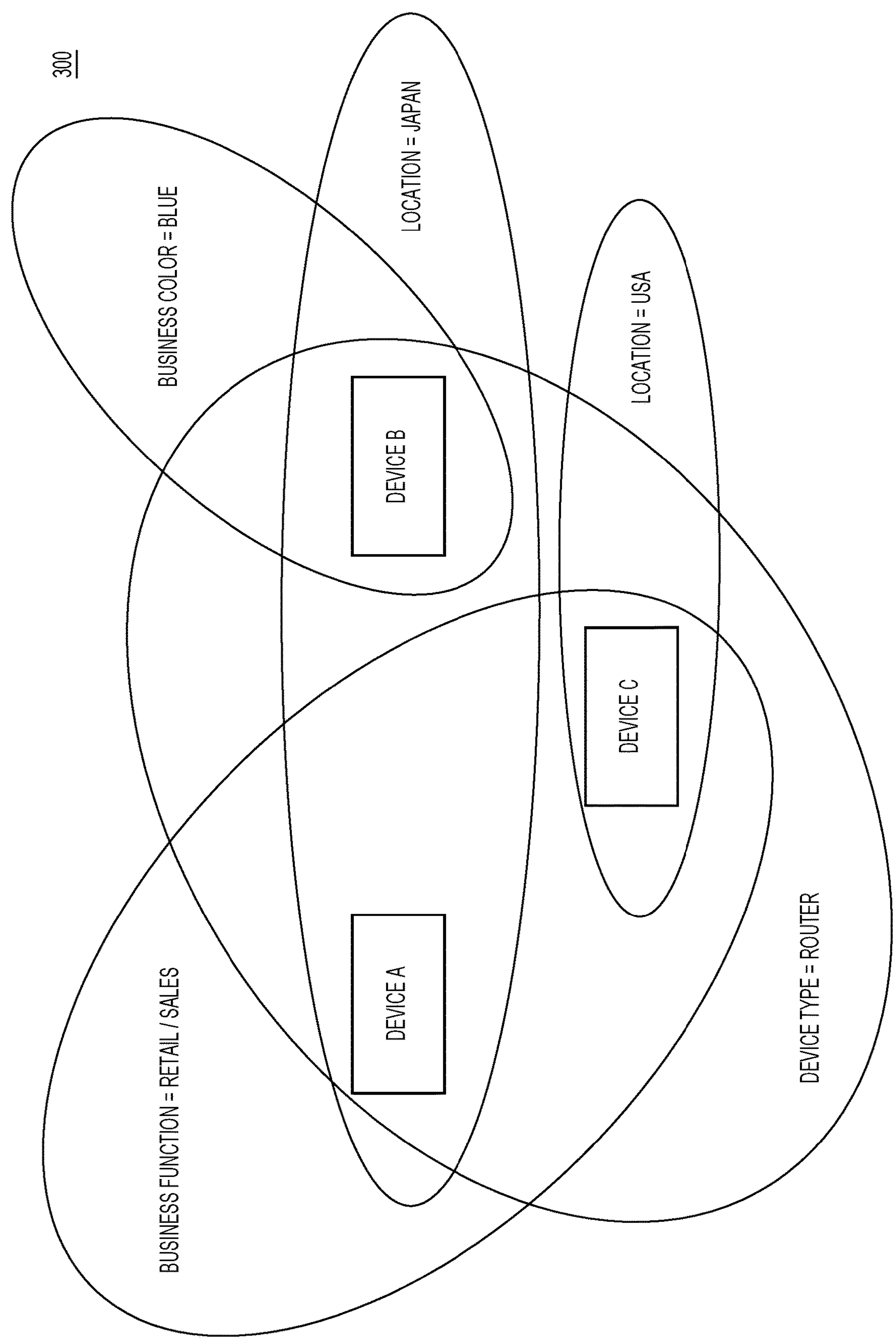
FIG. 3 shows classifiers assigned to multiple devices of the equipment infrastructure and that group the multiple devices based on commonality shared between the multiple devices, according to an example embodiment.

FIG. 3 shows example classifiers 300 assigned to devices A, B, and C such that the classifiers group the devices into distinct but overlapping or coextensive groups based on commonality shared between the devices. Devices A and C belong to classifier Business Function=Retail/Sales (i.e., Retail/Sales is assigned to devices A and C, only), which establishes devices A and C as a distinct group of (multiple) devices for classifier Retail/Sales. All devices A, B, and C belong to classifier Device Type=Router, devices A and B belong to classifier Location=Japan, device C belongs to classifier Location=USA, and device B belongs to classifier Business Color=Blue. Historical confidence scores (not shown in FIG. 3) for the above-listed classifiers span the same groups of devices defined by the classifiers and are independent of one another. Thus, a change to a historical confidence score for classifier Retail/Sales does not affect a historical confidence score associated with classifier USA. On the other hand, a change to a given historical confidence score for a given classifier applies to all devices that belong to the given classifier.

Figure 4:
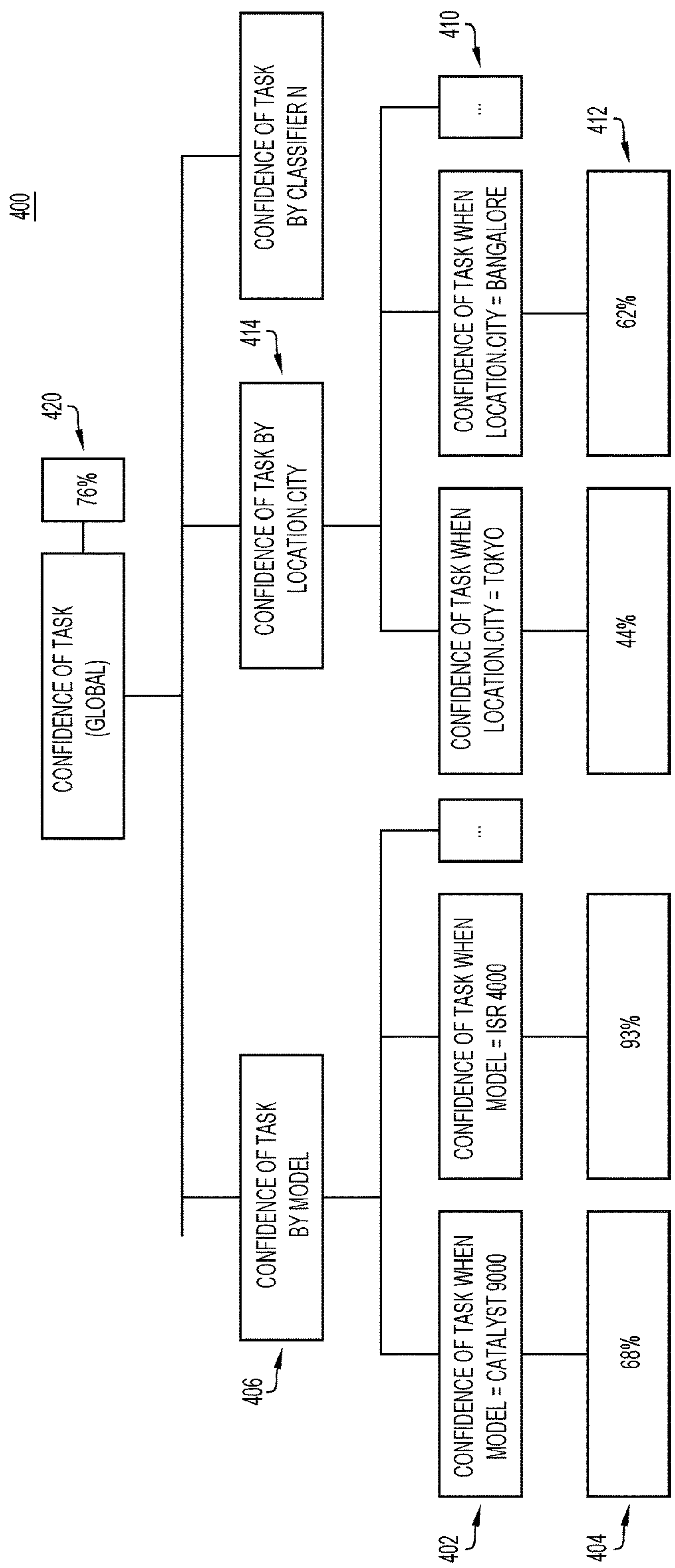
FIG. 4 shows a hierarchy of historical confidence scores that are mapped to corresponding classifiers for an automated response, according to an example embodiment.

FIG. 4 shows example hierarchical historical confidence scores 400 (each referred to in FIG. 4 as a "confidence of task") that are mapped to corresponding classifiers for given response actions (i.e., tasks). As shown, lower-level model classifiers 402 Catalyst 9000, ISR 4000 are mapped to respective lower-level historical confidence scores 404 68%, 93%, and optionally feed into a higher-level classifier 406 "Model."

Similarly, lower-level location classifiers 410 Tokyo, Bangalore, and so on, are mapped to respective lower-level historical confidence scores 412 44%, 62%, and so on, and optionally feed into a higher-level classifier 414 "Location."

The lower-level confidence scores and the higher-level confidence all feed into a global historical confidence score 420 that is computed based on all underlying historical confidence scores (e.g., as an average). With respect to a given device, the global historical confidence score may be computed based on the historical confidence scores associated with all underlying historical classifiers feeding into the global historical classifier including particular classifiers for particular groups of devices to which the given device does not belong.

Examples response rules that compare historical confidence scores against confidence thresholds to determine whether an automated response is permitted or denied are now described in connection with FIGS. 5-7. Complex rules engine 109 evaluates the response rules on behalf of controller 104.

Figure 5:
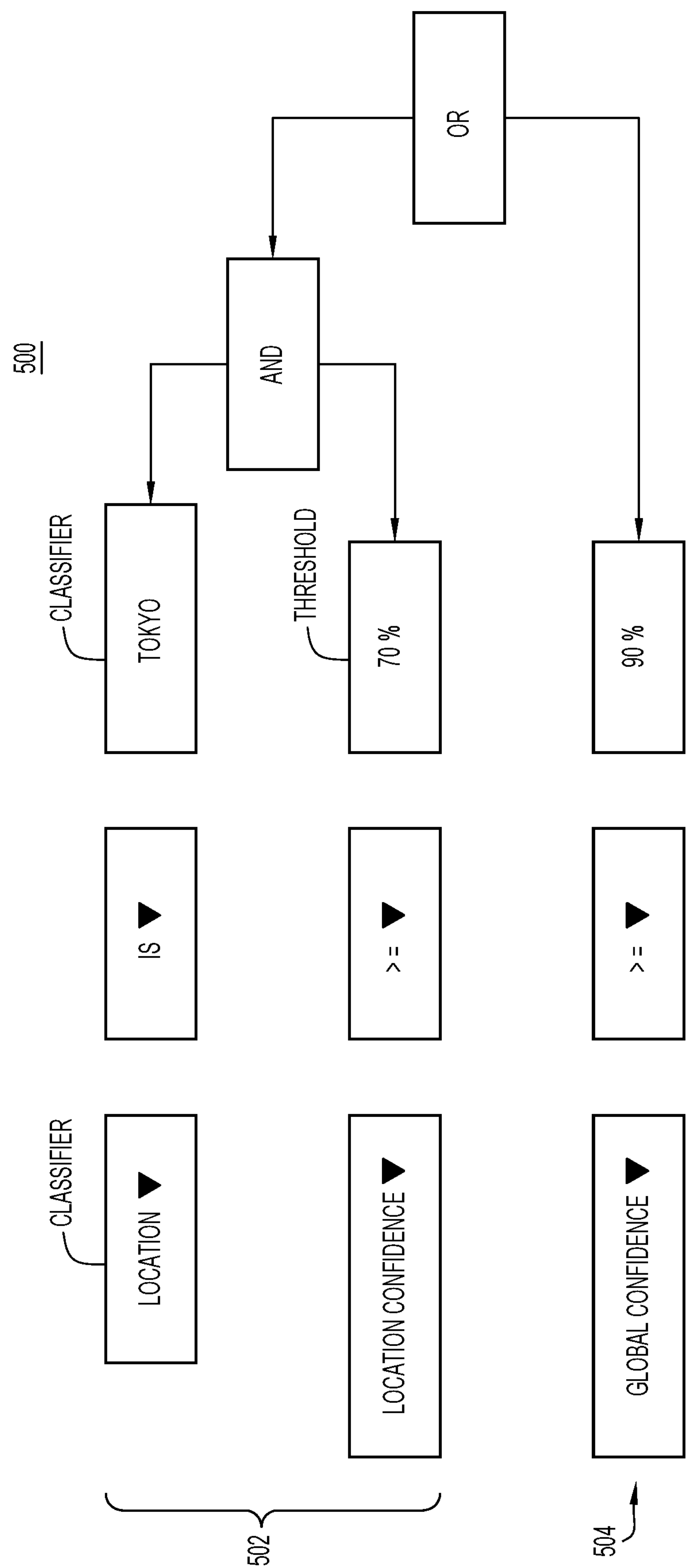
FIG. 5 shows "automatic approval" response rules used to evaluate whether an automated response is permitted, according to an example embodiment.

FIG. 5 shows example "automatic approval" response rules 500 used to evaluate whether an automated response, matched to an alarm event reported by a device in Tokyo, is permitted and should be executed by the device to remediate the alarm event. According to response rules 500, the automated response is permitted when (i) according to a first logic leg 502, the historical confidence score (labeled "location confidence") for classifier Location.Tokyo is greater than or equal to confidence threshold=70%, or (ii) according to a second logic leg 504, the global historical confidence score (labeled "global confidence") is greater than or equal to a confidence threshold=90%. When either condition is met, the automated response is automatically approved. When neither condition is met, the response is not permitted.

Figure 6:
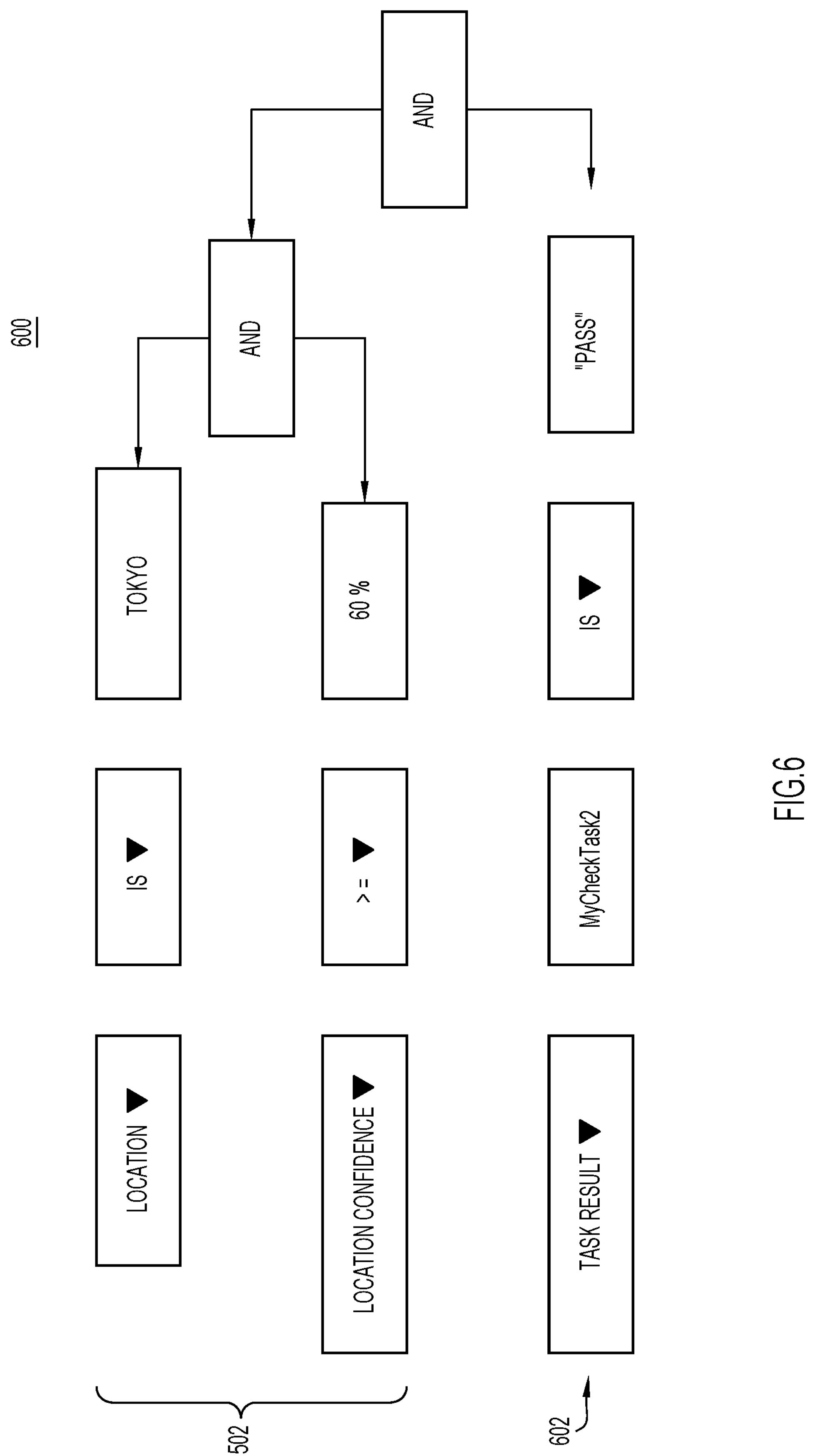
FIG. 6 shows "conditional approval" response rules used to evaluate whether an automated response is permitted, according to an example embodiment.

FIG. 6 shows example "conditional approval" response rules 600 used to evaluate whether the automated response is permitted and should be executed by the device. The conditional approval includes first logic leg 502 as described in connection with FIG. 5 and a second logic leg 602 that relies on a result of executing a second automated task "MyCheckTask2." According to response rules 600, the automated response is permitted when the condition of first logic leg 502 is met (as described above) and the condition set by second logic leg 602 is met (i.e., the result of MyCheckTask2=Pass).

Figure 7:
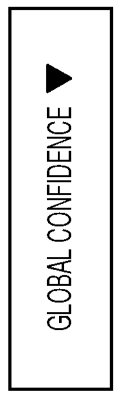
FIG. 7 shows a denial response rule, according to an example embodiment.

FIG. 7 shows example denial response rule 700. According to denial response rule 700, the automated response is denied and not executed when the global confidence is less than or equal to global confidence threshold=50%. Otherwise, the automated response is approved. In some examples, the response rules may prompt the administrator for real-time authorization before the automated response can be run.

Figure 8:
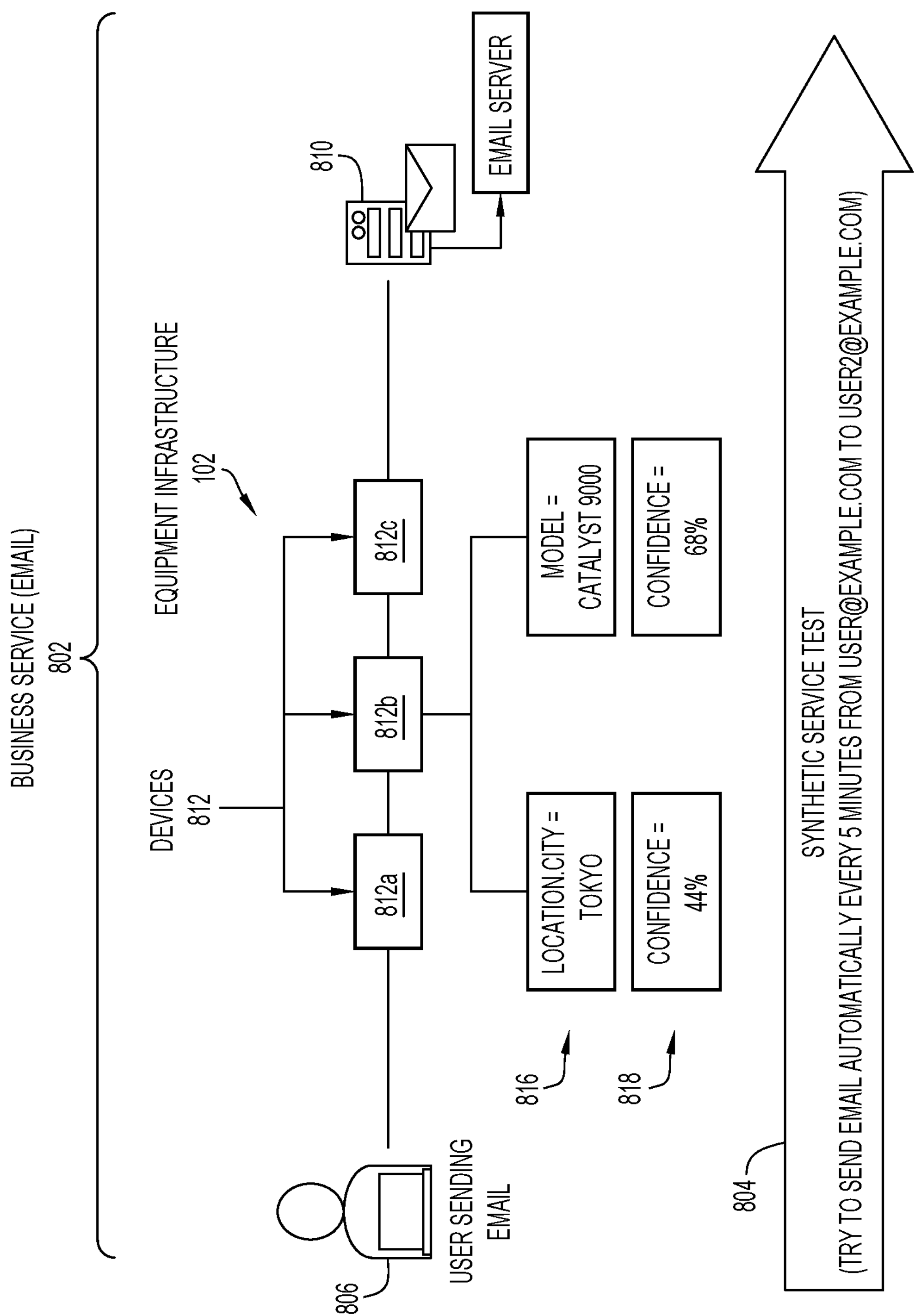
FIG. 8 shows a business service supported by the equipment infrastructure and a service test employed to test business service health, according to an example embodiment.

FIG. 8 shows an example business service 802 supported by equipment infrastructure 102 and a service test 804 (labeled "synthetic test" in FIG. 8) employed to test the health of the business service. Business service 802 includes an email service to send email from a user 806 to an email server 810 over devices 812 of equipment infrastructure 102. Devices 812 include a device 812*a* (e.g., a switch), a device 812*b* (e.g., a router), and a device 812*c* (e.g., a switch). As shown, datastore 106 includes classifiers 816 (location.city=Tokyo, model=Catalyst 9000) assigned to device 812*b* and historical confidence scores 818 (44%, 68%) corresponding to the classifiers.

"Over-the-top" service test 804 periodically (e.g., every 5 minutes) attempts to send a test email originated at user2@example.com through devices 812, to produce periodic test results. The test results build historical confidence scores (e.g., historical confidence scores 818) within classifiers (e.g., classifiers 816) to which multiple devices may belong.

Figure 9:
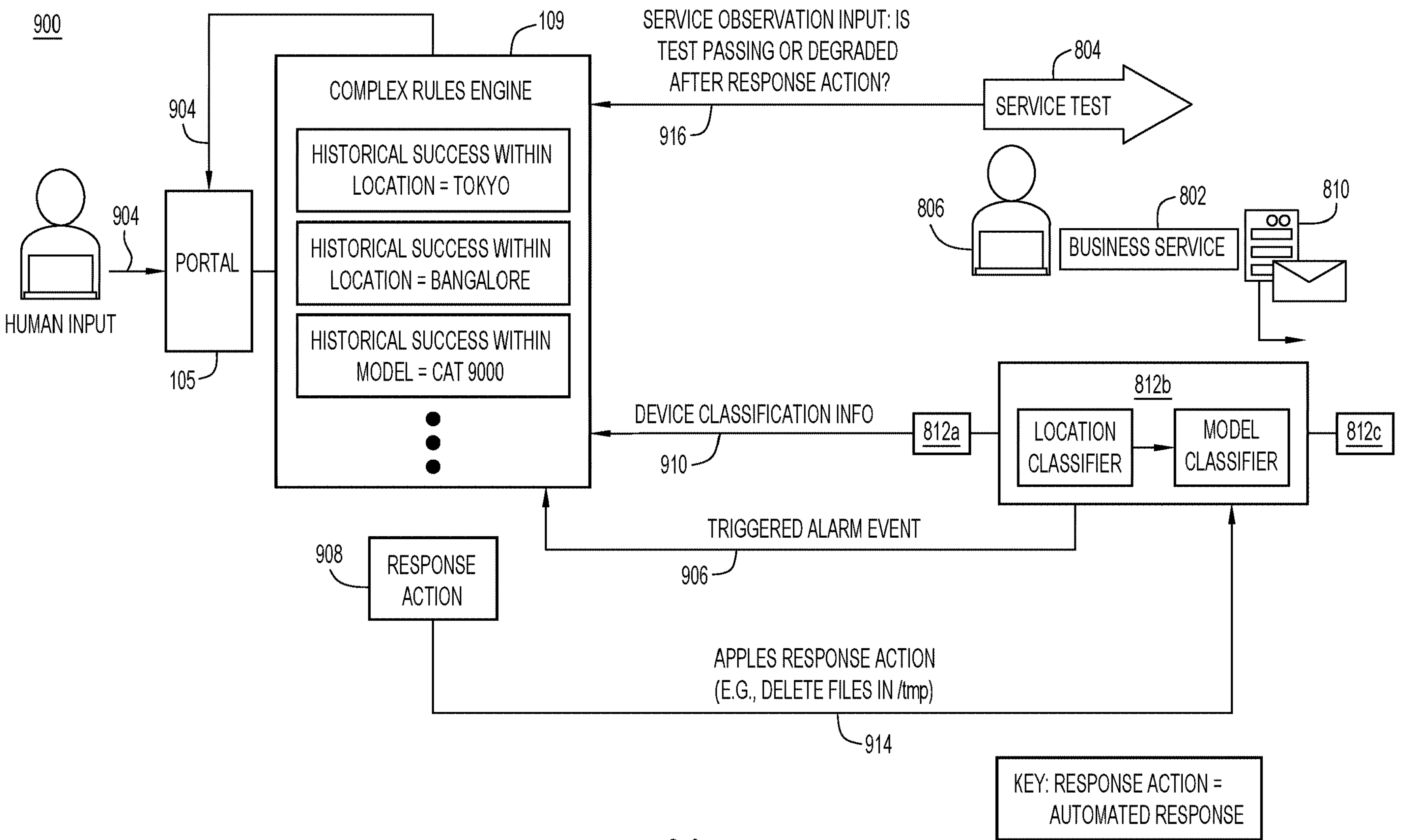
FIG. 9 shows an operational scenario for the system that expands on the example of FIG. 8, according to an example embodiment.

FIG. 9 is an illustration of an example operational scenario 900 for system 100 that expands on the example of FIG. 8, in which business service 802 and service test 804 operate on devices 812. At 904, an administrator supplies response rules and confidence thresholds to complex rules engine 109 through portal 105. In addition, the administrator may apply human reinforcement via manual approval to run response actions.

At 906, device 812*b* detects and reports an alarm event, e.g., "low disk alert" via an SNMP trap for disk nearly full. System 100 matches an automated response 908 to the alarm event, such as "delete files from tmp folder." Before applying the automated response, system 100, using complex rules engine 109, assesses the historical confidence scores for the automated response. To do this, at 910, complex rules engine 109 accesses the classifiers to which device 812*b* belongs, the confidence scores corresponding to the classifiers, and the relevant response rules for/corresponding to the automated response. Complex rules engine 109 evaluates the response rules by comparing the confidence scores to their corresponding confidence thresholds in accordance with the logic of the response rules, to produce an up/down outcome on whether to permit the automated action to proceed.

Assuming that results of the comparing indicate that the historical confidence scores exceed or are equal to their corresponding confidence thresholds, at 914, system 100 proceeds with the automated response. After the automated response is applied, at 916, system 100 runs service test 804 and monitors the test results as a measure of service health. If the test results indicate that the service test failed or that service health is degraded, system 100 reduces the historical confidence scores. On the other hand, if service health is not degraded or improves, system 100 increases the historical confidence scores.

System 100 computes historical confidence scores for all classifiers to which the device belongs. In the example of FIG. 9, device 812*b* has location classifier=Tokyo and model classifier=Catalyst 9000. System 100 computes a first historical confidence score for automated response="deleting file in tmp folder" within all devices with location classifier=Tokyo and a second confidence score for the automated response within all devices with model classifier=Catalyst 9000. Thus, each historical confidence scores spans all devices with/that belong to the same classifier(s). Thus, the administrator can set multiple response rules across multiple classifiers (e.g., rules such as: apply the automated response Catalyst 9000 devices in Tokyo if both the historical confidence score for running the automated response in location=Tokyo is 90% and the confidence score for running the automated response on model=Catalyst 9000 is 99%).

Figure 10:
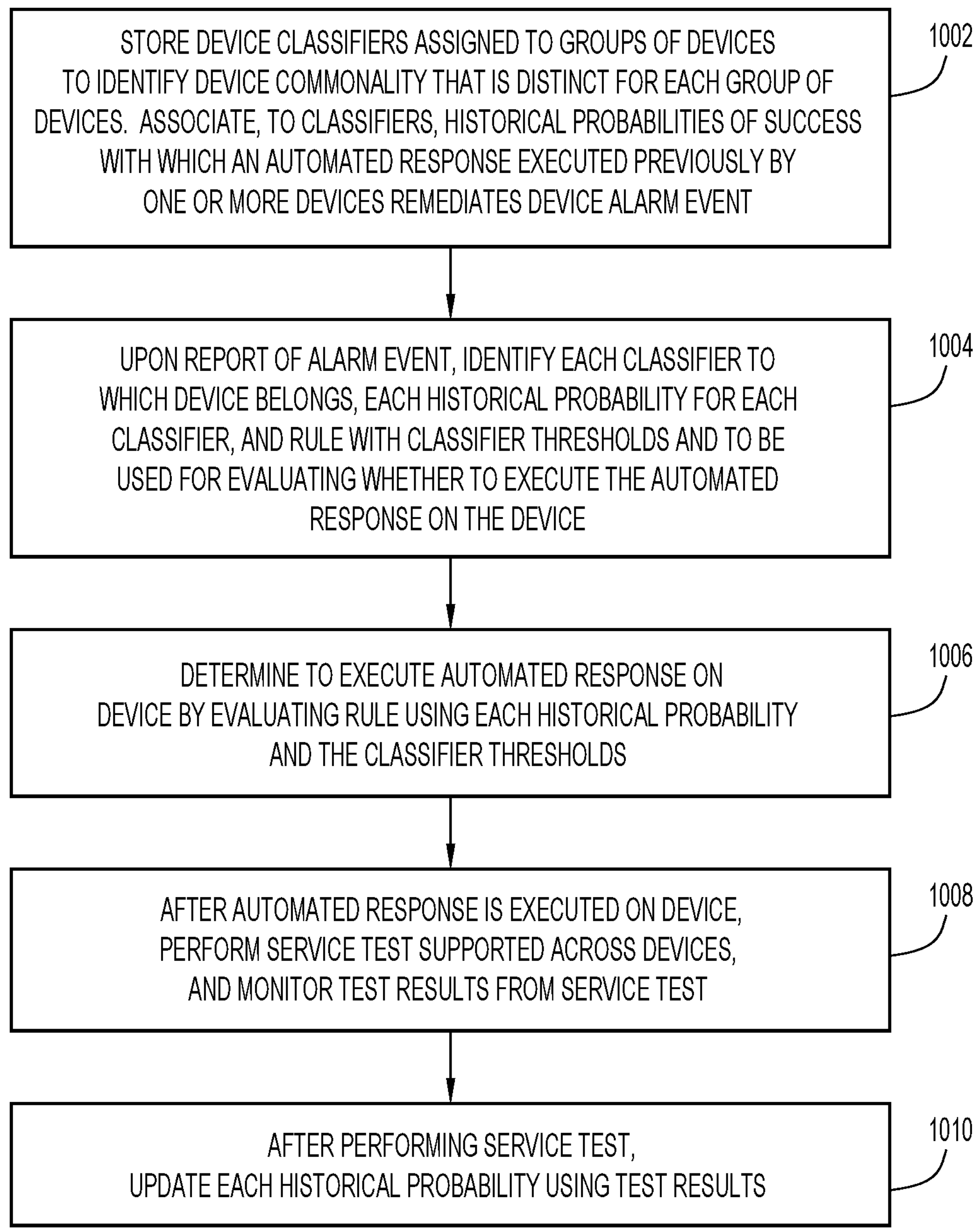
FIG. 10 is a flowchart of a method of performing confidence reinforcement of automated remediation decision making through full-stack observations and service health measurements, according to an example embodiment.

FIG. 10 is a flowchart of an example method 1000 of confidence reinforcement of automated remediation decision making through full-stack observations and service health measurements. Operations of method 1000 are described above. Method 1000 may be performed primarily by a controller (e.g., controller 104) configured to communicate with devices (e.g., devices 110) of a network (e.g., equipment infrastructure 102). In the ensuing description of FIG. 10, a historical confidence score is referred to as a historical probability of success (or simply historical probability).

At 1002, the controller stores classifiers assigned to groups of the devices to identify device commonality that is distinct for each group. The classifiers may include a device geolocation and one or more of a device type and a device model. Each classifier may span multiple ones of the devices. The controller also associates, to the classifiers, historical probabilities of success with which an automated response executed previously by one or more of the devices remediates a device alarm event.

At 1004, when a device of the devices reports the device alarm event to the controller, the controller identifies (i) each classifier to which the device belongs, (ii) each historical probability for each classifier, and (iii) a response rule (also referred to below as simply a "rule") with classifier thresholds and to be used for evaluating whether to execute the automated response on the device.

At 1006, the controller determines to execute the automated response on the device by evaluating the rule using each historical probability and the classifier thresholds. The controller determines to executed the automated response when evaluating the rule indicates that each historical probability exceeds or is equal to a corresponding one of the classifier thresholds. The controller deploys the automated response to the device, which executes the automated response.

At 1008, after the automated response is executed on the device, the controller performs a service test to test a service supported across the devices, and monitors test results from the service test. The controller may perform the service test repeatedly over a period of time after the automated test is executed on the device, and monitor the test results over the period of time. After performing the service test, the controller correlates the service test to the device. The service test may be deemed relevant to scoring the success of the automated response (see 1010 below) when a network address (e.g., an IP address) of the device (targeted by the automated response) is in a dependency database for a test path (e.g., a list of next hop addresses for the test path) of the network that was exercised by the service test. Thus, the controller determines whether the device is in the test path exercised by the service test (i.e., whether the service test is correlated to the device) based on the network address of the device and the service dependency database. When the device is in the test path, the service test is correlated to the device, and flow proceeds to 1010 where the controller performs an update as described below. When the device is not in the test path, the service test is not correlated, and the controller does not perform the update.

At 1010, after the service test is performed and deemed correlated to the device, the controller updates each historical probability using the test results. Specifically, when the test results indicate success, the controller increases each historical probability, and when the test results indicate failure, the controller decreases each historical probability. The controller performs the update across each group of devices corresponding to each classifier.

In addition, when the rule includes a global compare of a global historical probability for the automated response against a global confidence threshold, the controller retrieves the global historical probability for the global classifier to which the device belongs (along with the underlying historical probabilities mentioned above) and determines to permit the automated response at least based in part on results of the global compare (e.g., when the global historical probability exceeds the global confidence threshold). After performing the service test, the controller updates the global historical probability based on each of the updated (underlying) historical probabilities.

In another embodiment, confidence scores may be associated to a service catalog of predefined change types or predefined configurations for devices. The confidence scores may be computed from service health measurements, but are not tied to closed-loop auto-remediation. In an example, consider a company that has a list of changes to be implemented on devices manually, such as upgrading software on a router. After a given manual service task is performed on a device, service tests may be performed, followed by scoring the success/confidence of the service task, and attribute/updating the confidence of the service task. When the service task is to be performed again manually (e.g., a manual change to upgrade a router in Tokyo), the historical confidence score for applying the service task to the device in that environment may be observed, and used as input to judge the risk of the change and whether it should be performed.

Figure 11:
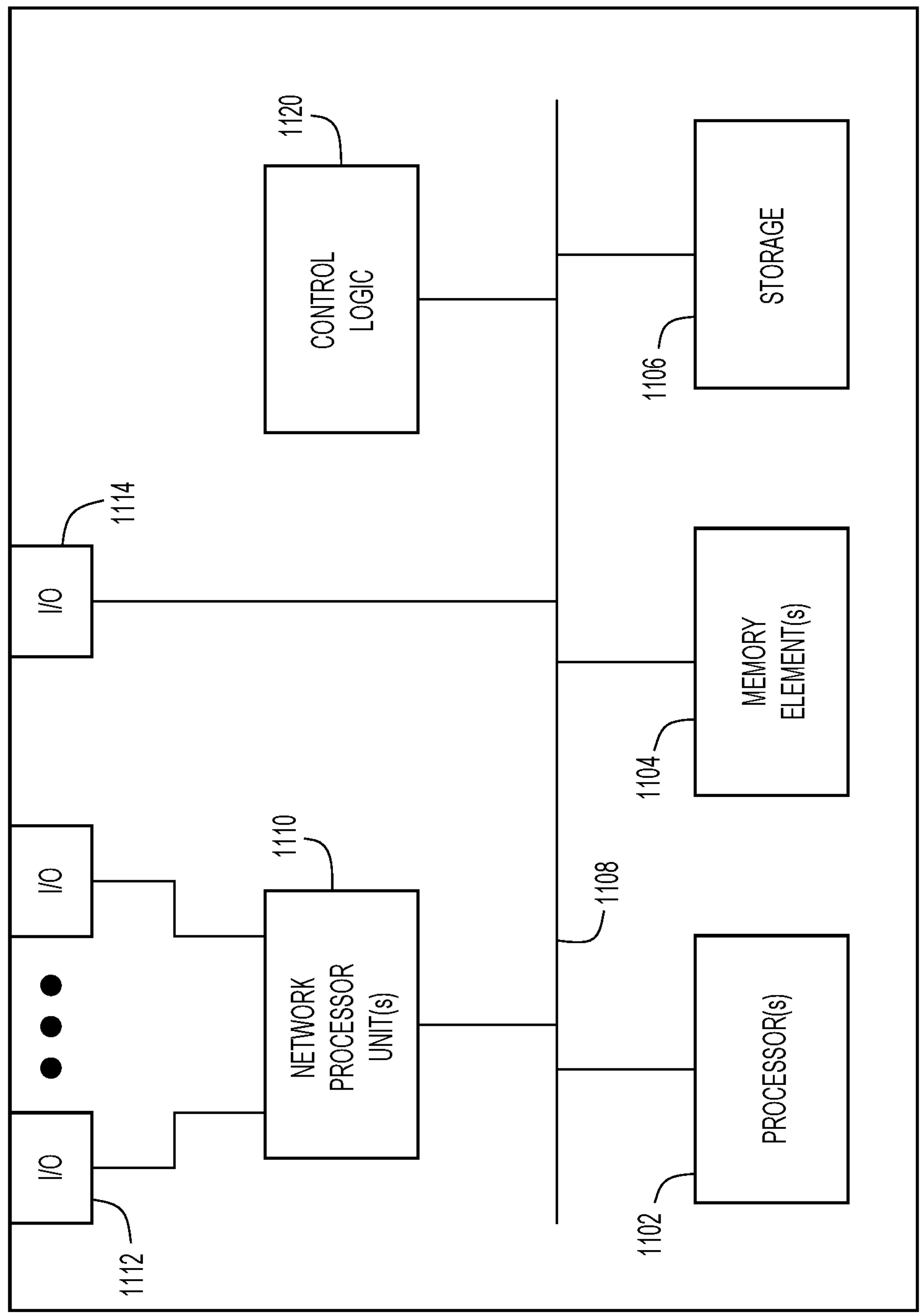
FIG. 11 illustrates a hardware block diagram of a computing device that may perform functions associated with operations discussed herein, according to an example embodiment.

Referring to FIG. 11, FIG. 11 illustrates a hardware block diagram of a computing device 1100 that may perform functions associated with operations discussed herein in connection with the techniques depicted in FIGS. 1-10. In various embodiments, a computing device or apparatus, such as computing device 1100 or any combination of computing devices 1100, may be configured as any entity/entities as discussed for the techniques depicted in connection with FIGS. 1-10 in order to perform operations of the various techniques discussed herein. For example, computing device 1100 may represent controller 104, complex rules engine 109, portal 105, and devices 110 of equipment infrastructure 102.

In at least one embodiment, the computing device 1100 may be any apparatus that may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with memory element(s) 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 (wired and/or wireless) to facilitate operations discussed for various embodiments described herein. In various embodiments, network processor unit(s) 1110 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, any other I/O port(s), and/or antenna(s)/antenna array(s) now known or hereafter developed. Thus, the network processor unit(s) 1110 and/or network I/O interface(s) 1112 may include suitable interfaces for receiving, transmitting, and/or otherwise communicating data and/or information in a network environment.

I/O interface(s) 1114 allow for input and output of data and/or information with other entities that may be connected to computing device 1100. For example, I/O interface(s) 1114 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1120 can include instructions that, when executed, cause processor(s) 1102 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1120) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1104 and/or storage 1106 can store data, software, code, instructions (e.g., processor instructions), logic, parameters, combinations thereof, and/or the like used for operations described herein. This includes memory element(s) 1104 and/or storage 1106 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a method including: by a controller configured to communicate with devices of a network, storing classifiers assigned to groups of the devices to identify device commonality that is distinct for each group; associating, to the classifiers, historical probabilities of success with which an automated response executed by one or more of the devices remediates a device alarm event; when a device of the devices reports the device alarm event, identifying each classifier to which the device belongs, each historical probability for each classifier, and classifier thresholds; determining to execute the automated response on the device using each historical probability and the classifier thresholds; after the automated response is executed on the device, performing a service test to test a service supported across the devices, and monitoring test results from the service test; and after the service test, updating each historical probability using the test results.

In some aspects, the techniques described herein relate to a method, wherein updating each historical probability includes: when the test results indicate success, increasing each historical probability; and when the test results indicate failure, decreasing each historical probability.

In some aspects, the techniques described herein relate to a method, wherein: identifying further includes identifying a rule with the classifier thresholds for evaluating whether to execute the automated response on the device; and determining includes determining to execute the automated response on the device by evaluating the rule using each historical probability and the classifier thresholds.

In some aspects, the techniques described herein relate to a method, wherein: determining further includes determining to execute the automated response when evaluating the rule indicates that each historical probability exceeds or is equal to a corresponding one of the classifier thresholds.

In some aspects, the techniques described herein relate to a method, further including: computing a global historical probability based on the historical probabilities of all of the classifiers, wherein determining further includes determining to execute the automated response when evaluating indicates that the global historical probability exceeds a global threshold for the global historical probability.

In some aspects, the techniques described herein relate to a method, wherein: computing includes computing the global historical probability based on the historical probabilities associated with all of the classifiers including particular classifiers of the classifiers for particular groups of the groups to which the device does not belong.

In some aspects, the techniques described herein relate to a method, wherein: the classifiers define logical attributes of the device; and the historical probabilities are associated with the logical attributes.

In some aspects, the techniques described herein relate to a method, wherein: identifying includes identifying each classifier assigned to each group to which the device belongs; and updating includes updating each historical probability across each group.

In some aspects, the techniques described herein relate to a method, further including: monitoring includes monitoring the test results of the service test over a period of time during which the service test is performed repeatedly.

In some aspects, the techniques described herein relate to a method, further including: determining whether the device is in a test path of the network that was exercised by the service test based on a network address of the device; when the device is in the test path, updating each historical probability; and when the device is not in the test path, not updating each historical probability.

In some aspects, the techniques described herein relate to a method, wherein: the classifiers include descriptive labels that define commonality between the devices.

In some aspects, the techniques described herein relate to a method, wherein: each classifiers spans multiple ones of the devices.

In some aspects, the techniques described herein relate to an apparatus including: one or more network processor units to communicate with devices in a network; and a processor coupled to the one or more network processor units and configured to perform: storing classifiers assigned to groups of the devices to identify device commonality that is distinct for each group; associating, to the classifiers, historical probabilities of success with which an automated response executed by one or more of the devices remediates a device alarm event; when a device of the devices reports the device alarm event, identifying each classifier to which the device belongs, each historical probability for each classifier, and classifier thresholds; determining to execute the automated response on the device using each historical probability and the classifier thresholds; after the automated response is executed on the device, performing a service test to test a service supported across the devices and monitoring test results from the service test; and after the service test, updating each historical probability using the test results.

In some aspects, the techniques described herein relate to an apparatus, wherein the processor is configured to perform updating each historical probability by: when the test results indicate success, increasing each historical probability; and when the test results indicate failure, decreasing each historical probability.

In some aspects, the techniques described herein relate to an apparatus, wherein: the processor is configured to perform identifying by identifying a rule with the classifier thresholds for evaluating whether to execute the automated response on the device; and the processor is configured to perform determining by determining to execute the automated response on the device by evaluating the rule using each historical probability and the classifier thresholds.

In some aspects, the techniques described herein relate to an apparatus, wherein: the processor is further configured to perform determining by determining to execute the automated response when evaluating indicates that each historical probability exceeds or is equal to a corresponding one of the classifier thresholds.

In some aspects, the techniques described herein relate to an apparatus, wherein the processor is further configured to perform: computing a global historical probability based on the historical probabilities of all of the classifiers, wherein the processor is configured to perform determining by determining to execute the automated response when evaluating indicates that the global historical probability exceeds a global threshold for the global historical probability.

In some aspects, the techniques described herein relate to a non-transitory computer readable medium encoded with instructions that, when executed by a processor configured to communicate with devices over a network, causes the processor to perform: storing classifiers assigned to groups of the devices to identify device commonality that is distinct for each group; associating, to the classifiers, historical probabilities of success with which an automated response executed by one or more of the devices remediates a device alarm event; when a device of the devices reports the device alarm event, identifying each classifier to which the device belongs, each historical probability for each classifier, and classifier thresholds; determining to execute the automated response on the device using each historical probability and the classifier thresholds; after the automated response is executed on the device, performing a service test to test a service supported across the devices, and monitoring test results from the service test; and after the service test, updating each historical probability using the test results.

In some aspects, the techniques described herein relate to a non-transitory computer readable medium, wherein the instructions to cause the processor to perform updating each historical probability include instructions to cause the processor to perform: when the test results indicate success, increasing each historical probability; and when the test results indicate failure, decreasing each historical probability.

In some aspects, the techniques described herein relate to a non-transitory computer readable medium, wherein: the instructions to cause the processor to perform identifying include instructions to cause the processor to perform identifying a rule with the classifier thresholds for evaluating whether to execute the automated response on the device; and the instructions to cause the processor to perform determining include instructions to cause the processor to perform determining to execute the automated response on the device by evaluating the rule using each historical probability and the classifier thresholds.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

by a controller configured to communicate with devices of a network, storing classifiers assigned to groups of the devices to identify device commonality that is distinct for each group;

associating, to the classifiers, historical probabilities of success with which an automated response executed by one or more of the devices remediates a device alarm event;

when a device of the devices reports the device alarm event, identifying each classifier to which the device belongs, each historical probability for each classifier, and classifier thresholds;

determining to execute the automated response on the device using each historical probability and the classifier thresholds;

after the automated response is executed on the device, performing a service test to test a service supported across the devices, and monitoring test results from the service test; and after the service test, updating each historical probability using the test results.

2. The method of claim 1, wherein updating each historical probability includes:

when the test results indicate success, increasing each historical probability; and when the test results indicate failure, decreasing each historical probability.

3. The method of claim 1, wherein:

identifying further includes identifying a rule with the classifier thresholds for evaluating whether to execute the automated response on the device; and determining includes determining to execute the automated response on the device by evaluating the rule using each historical probability and the classifier thresholds.

4. The method of claim 3, wherein:

determining further includes determining to execute the automated response when evaluating the rule indicates that each historical probability exceeds or is equal to a corresponding one of the classifier thresholds.

5. The method of claim 3, further comprising:

computing a global historical probability based on the historical probabilities of all of the classifiers, wherein determining further includes determining to execute the automated response when evaluating indicates that the global historical probability exceeds a global threshold for the global historical probability.

6. The method of claim 5, wherein:

computing includes computing the global historical probability based on the historical probabilities associated with all of the classifiers including particular classifiers of the classifiers for particular groups of the groups to which the device does not belong.

7. The method of claim 1, wherein:

the classifiers define logical attributes of the device; and the historical probabilities are associated with the logical attributes.

8. The method of claim 1, wherein:

identifying includes identifying each classifier assigned to each group to which the device belongs; and updating includes updating each historical probability across each group.

9. The method of claim 1, further comprising:

monitoring includes monitoring the test results of the service test over a period of time during which the service test is performed repeatedly.

10. The method of claim 1, further comprising:

determining whether the device is in a test path of the network that was exercised by the service test based on a network address of the device;

when the device is in the test path, updating each historical probability; and when the device is not in the test path, not updating each historical probability.

11. The method of claim 1, wherein:

the classifiers include descriptive labels that define commonality between the devices.

12. The method of claim 1, wherein:

each classifiers spans multiple ones of the devices.

13. An apparatus comprising:

one or more network processor units to communicate with devices in a network; and a processor coupled to the one or more network processor units and configured to perform:

storing classifiers assigned to groups of the devices to identify device commonality that is distinct for each group;

associating, to the classifiers, historical probabilities of success with which an automated response executed by one or more of the devices remediates a device alarm event;

when a device of the devices reports the device alarm event, identifying each classifier to which the device belongs, each historical probability for each classifier, and classifier thresholds;

determining to execute the automated response on the device using each historical probability and the classifier thresholds;

after the automated response is executed on the device, performing a service test to test a service supported across the devices and monitoring test results from the service test; and after the service test, updating each historical probability using the test results.

14. The apparatus of claim 13, wherein the processor is configured to perform updating each historical probability by:

when the test results indicate success, increasing each historical probability; and when the test results indicate failure, decreasing each historical probability.

15. The apparatus of claim 13, wherein:

the processor is configured to perform identifying by identifying a rule with the classifier thresholds for evaluating whether to execute the automated response on the device; and the processor is configured to perform determining by determining to execute the automated response on the device by evaluating the rule using each historical probability and the classifier thresholds.

16. The apparatus of claim 15, wherein:

the processor is further configured to perform determining by determining to execute the automated response when evaluating indicates that each historical probability exceeds or is equal to a corresponding one of the classifier thresholds.

17. The apparatus of claim 15, wherein the processor is further configured to perform:

computing a global historical probability based on the historical probabilities of all of the classifiers, wherein the processor is configured to perform determining by determining to execute the automated response when evaluating indicates that the global historical probability exceeds a global threshold for the global historical probability.

18. A non-transitory computer readable medium encoded with instructions that, when executed by a processor configured to communicate with devices over a network, causes the processor to perform:

storing classifiers assigned to groups of the devices to identify device commonality that is distinct for each group;

associating, to the classifiers, historical probabilities of success with which an automated response executed by one or more of the devices remediates a device alarm event;

when a device of the devices reports the device alarm event, identifying each classifier to which the device belongs, each historical probability for each classifier, and classifier thresholds;

determining to execute the automated response on the device using each historical probability and the classifier thresholds;

after the automated response is executed on the device, performing a service test to test a service supported across the devices, and monitoring test results from the service test; and after the service test, updating each historical probability using the test results.

19. The non-transitory computer readable medium of claim 18, wherein the instructions to cause the processor to perform updating each historical probability include instructions to cause the processor to perform:

when the test results indicate success, increasing each historical probability; and when the test results indicate failure, decreasing each historical probability.

20. The non-transitory computer readable medium of claim 18, wherein:

the instructions to cause the processor to perform identifying include instructions to cause the processor to perform identifying a rule with the classifier thresholds for evaluating whether to execute the automated response on the device; and the instructions to cause the processor to perform determining include instructions to cause the processor to perform determining to execute the automated response on the device by evaluating the rule using each historical probability and the classifier thresholds.

* * * * *